United States Patent [19]
Andre

[11] Patent Number: 4,902,030
[45] Date of Patent: Feb. 20, 1990

[54] SHORT HITCH WITH VARIABLE GEOMETRY AND LINKAGE SUPPORT BEARINGS MOVABLE IN A CIRCULAR ARC FOR SO-CALLED BALANCED TRAILERS AND SEMI-TRAILERS

[75] Inventor: Jean L. Andre, Dangolsheim, France
[73] Assignee: Lohr Industrie, S.A., Hangenbieten, France
[21] Appl. No.: 207,587
[22] Filed: Jun. 16, 1988
[30] Foreign Application Priority Data
Jun. 18, 1987 [FR] France ................... 87 08689
[51] Int. Cl.⁴ .............................................. B60D 1/22
[52] U.S. Cl. ............................ 280/455.1; 280/460.1
[58] Field of Search ................ 280/458, 482, 446.1, 280/455.1, 460.1, 461.1

[56] References Cited
U.S. PATENT DOCUMENTS
1,429,734 9/1922 Hoffman .................. 280/458 X
2,378,297 6/1945 Hetzler ...................... 280/458
4,611,821 9/1986 Jeanson et al. ............... 280/482

FOREIGN PATENT DOCUMENTS
436748 11/1926 Fed. Rep. of Germany ...... 280/482
3344391 6/1985 Fed. Rep. of Germany ...... 280/482
8301911 12/1984 Netherlands ...................... 280/482

Primary Examiner—Charles A. Marmor
Assistant Examiner—Michael Mar
Attorney, Agent, or Firm—Schwartz & Weinrieb

[57] ABSTRACT

Hitch characterized by the fact that on the one hand, an extensible drawbar (5) has an associated means of continuous elastic return to a position of minimum separation of the trailer from the truck, and on the other hand, it has two associated symmetrical linkage support bearings (20) and (21) each movable in a circular path around a vertical pivot axis located on the truck and appropriate for each side. This invention is of interest to the manufacturers of road vehicles and more particularly of trucks and their equipment.

10 Claims, 8 Drawing Sheets

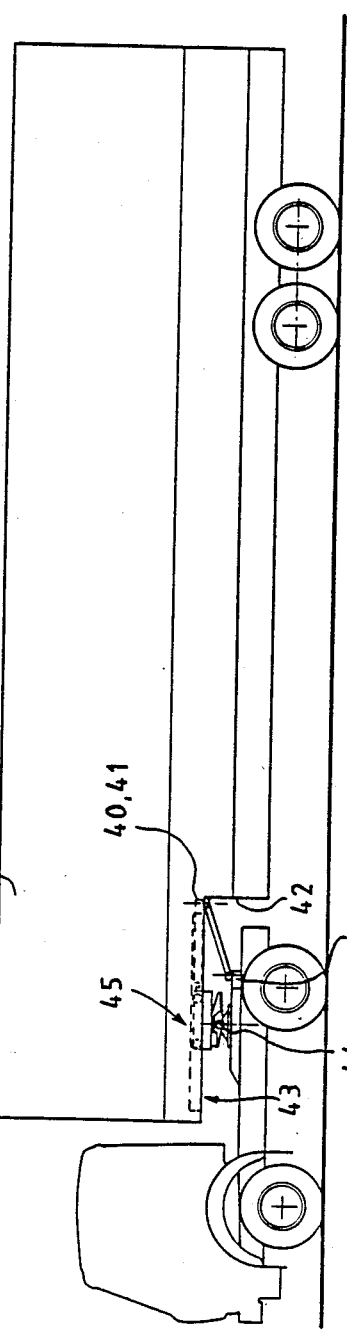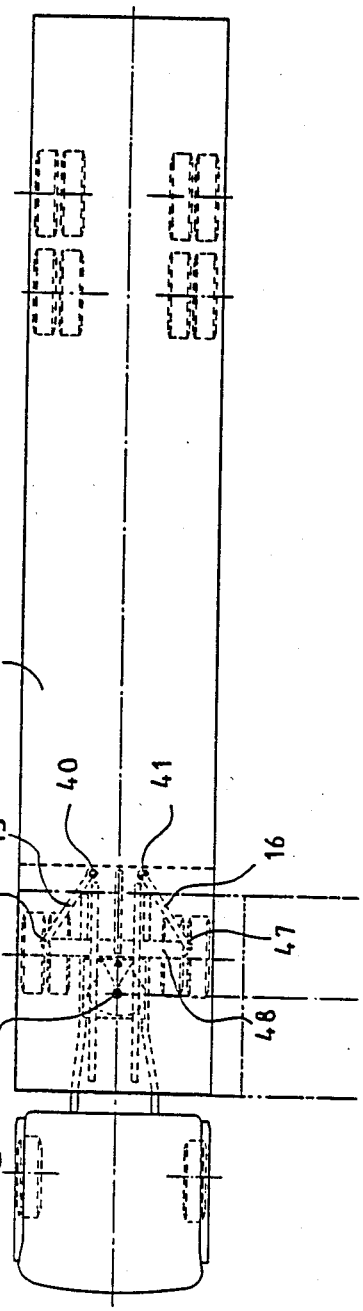

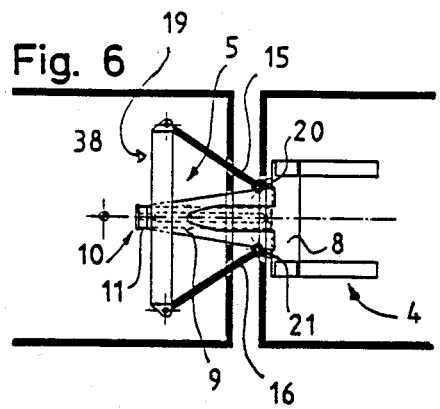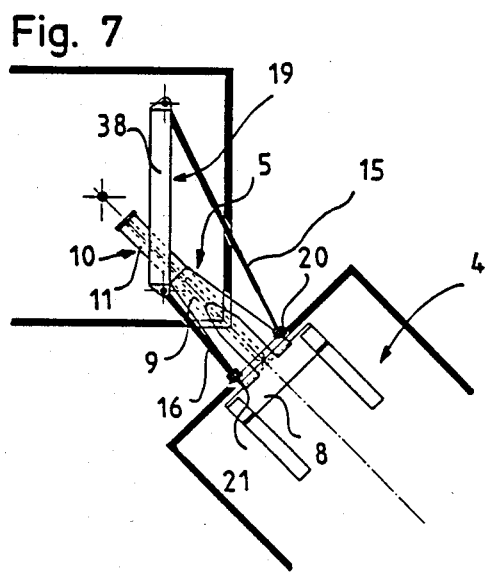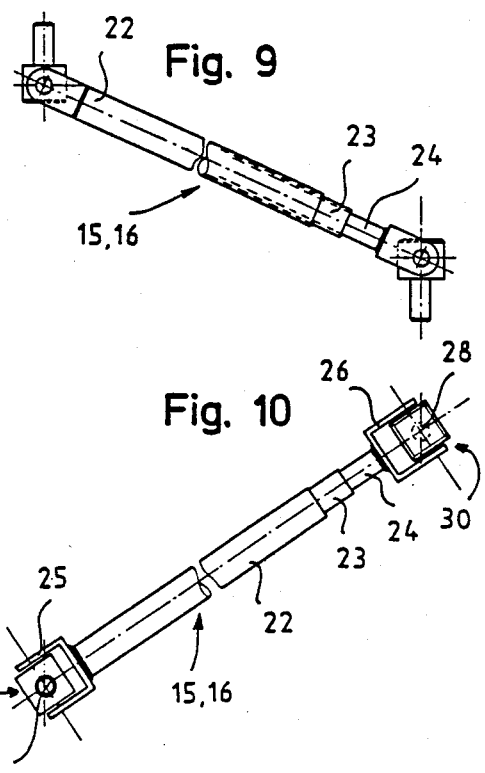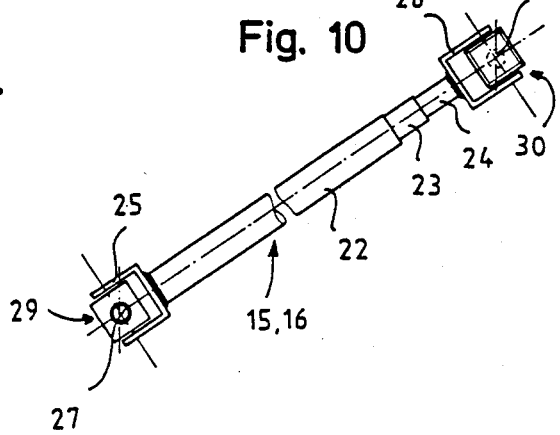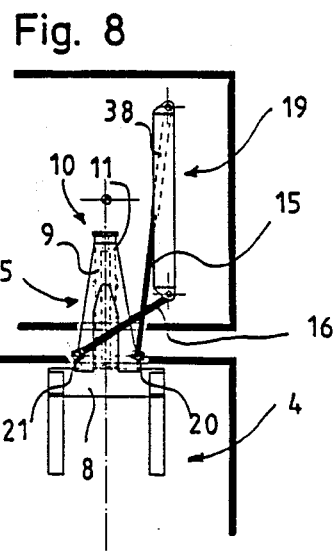

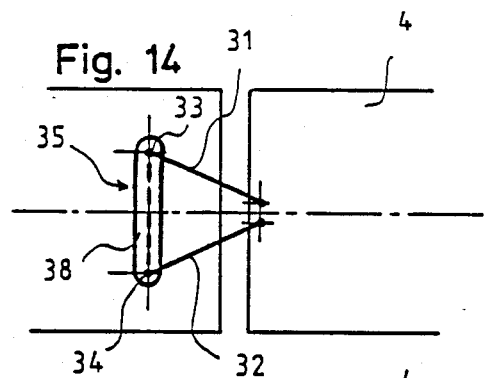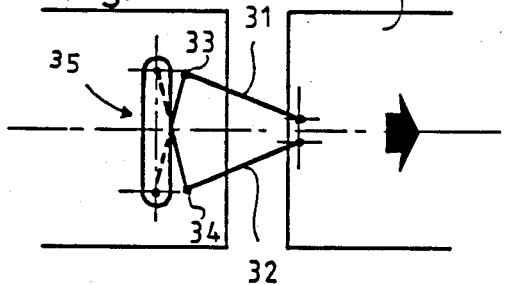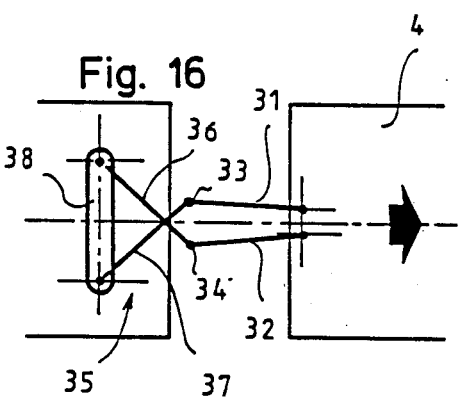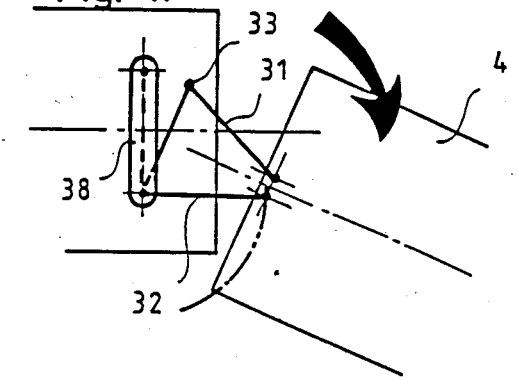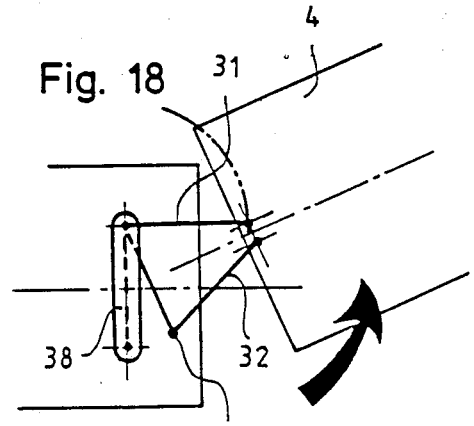

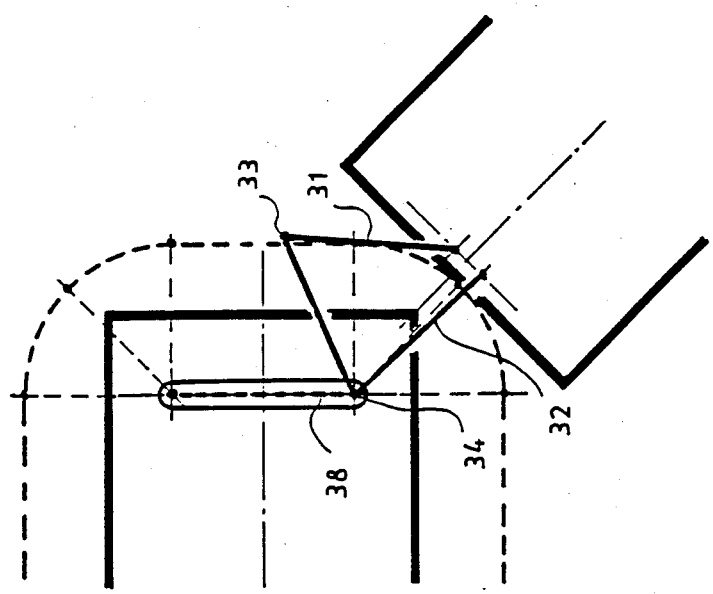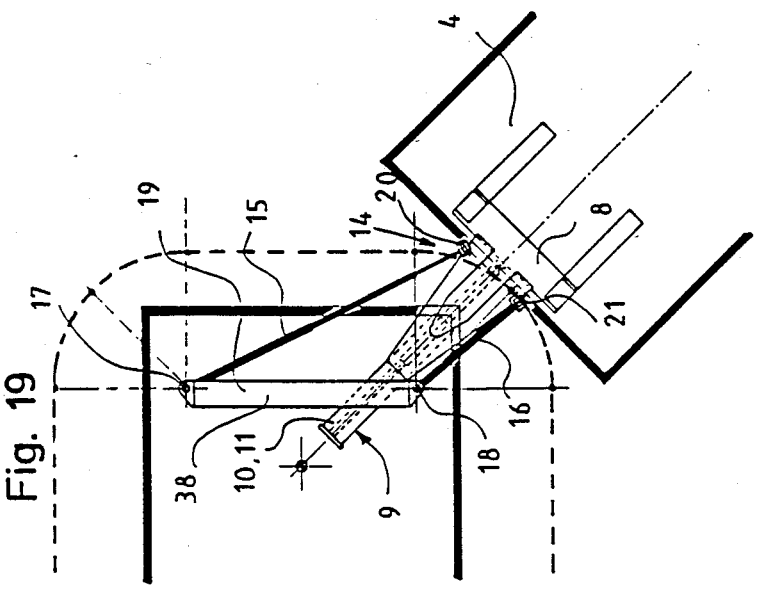

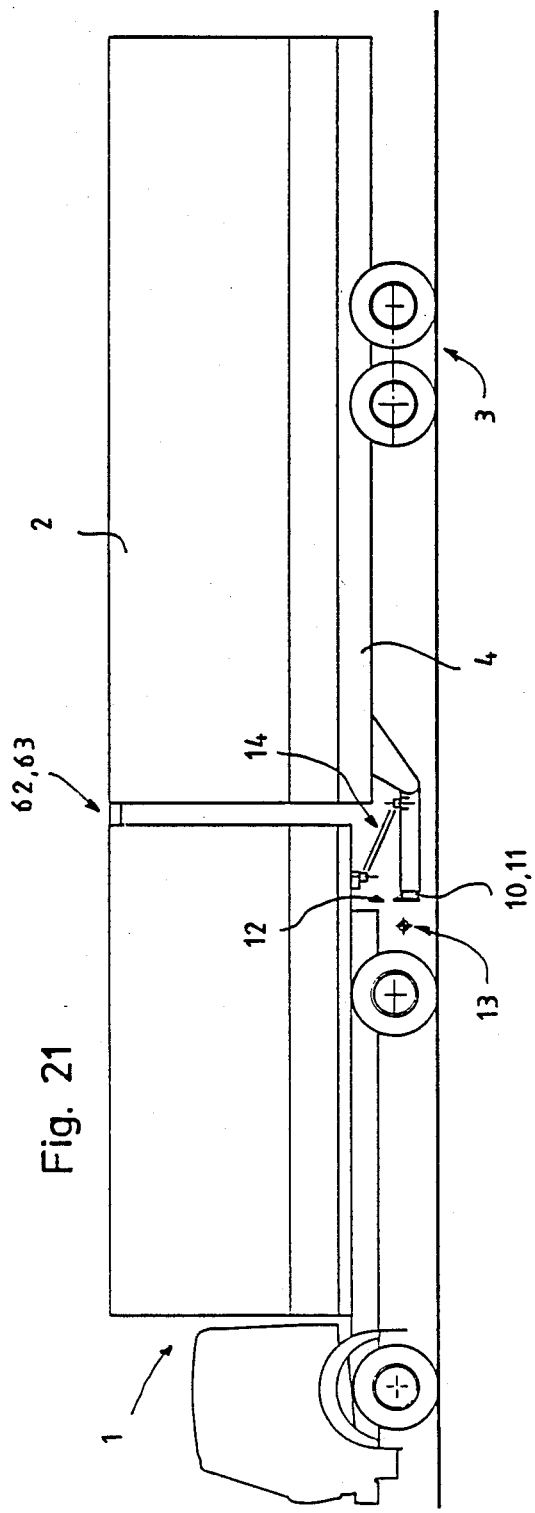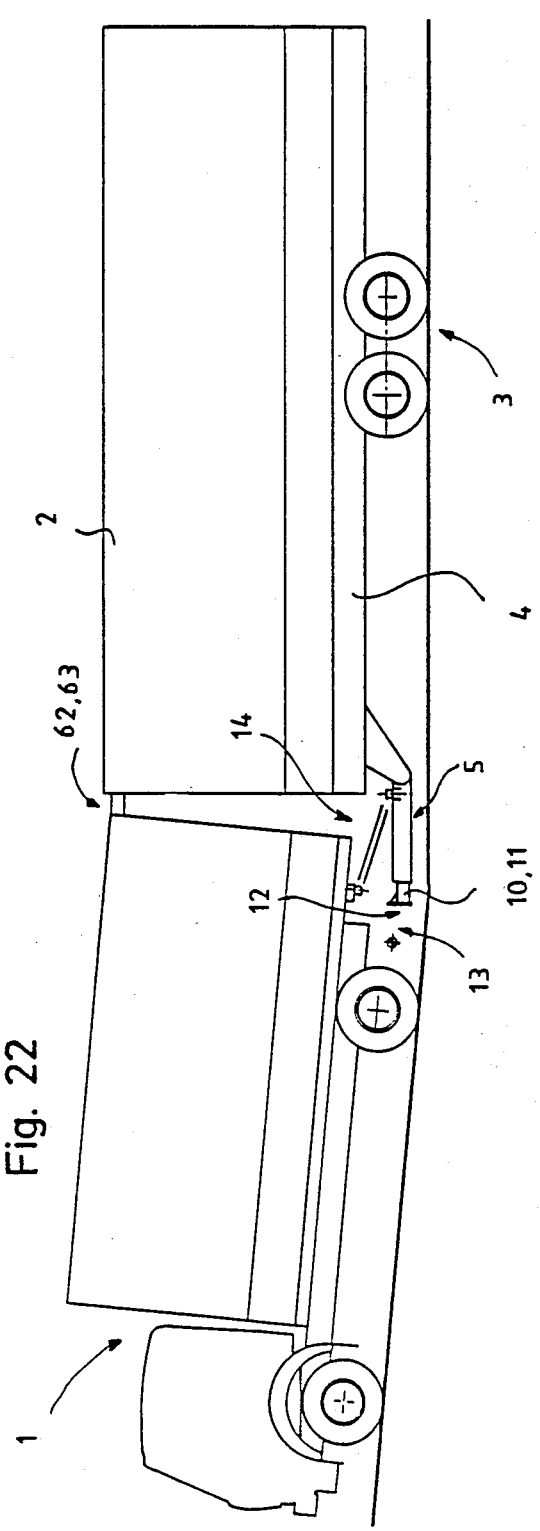

SHORT HITCH WITH VARIABLE GEOMETRY AND LINKAGE SUPPORT BEARINGS MOVABLE IN A CIRCULAR ARC FOR SO-CALLED BALANCED TRAILERS AND SEMI-TRAILERS

This invention concerns a short hitch of variable geometry with movable symmetrical bearings for the linkage and support between a tractor truck and its trailer, especially for balanced trailers and semi-trailers and more generally all trailers with no front axle.

More particularly pursuant to this invention, the movable linkage support bearings between the trailer and the truck are movable over a circular arc path.

The technical sector addressed by the invention is that of highway transport by units composed of a tractor truck hitched to a trailer or linked to a semi-trailer.

The short hitch with variable geometry pursuant to the invention refers more particularly to a tractor attached to its trailer or linked to a semi-trailer by a hitch of minimal variable length depending on the turning radius, so as to remain within the legal length limits for a highway unit in a straight line.

Since the length limit for a highway unit is imposed by highway rules, only the length of the hitch or the distance separating the front of the semi-trailer from the rear of the cabin can be reduced to extend loading capacity.

For safety reasons, the length of the linked joint itself is limited by the minimum possible distance between the rear portion of the truck and the front of the trailer, or between the cabin and the semi-trailer. Actually, the clearance between the truck and its trailer or between the cabin and the semi-trailer has to be sufficient to prevent the two connected sections from colliding, either in turns when the corners of the trailer may hit the rear face of the truck or of the cabin, or on bumps or hollows where the same risk is represented by either the bottom or the top edge of the trailer.

The various manufacturers, to increase the loading capacity of their hauled or semi-carried road units, have conceived of various technical methods to make the length of the hitch variable from a retracted position in a straight line that satisfies the legal requirements to an elongated position in turning or during maneuvers to provide for free angular excursion of the trailer or semi-trailer even in the case of very sharp curves.

Of course, the minimum distance between the trailer and the rear face of the truck body or of the cabin is intended in the retracted position, in order to gain as much loading capacity as possible.

This gain proves to be all the more important if it permits gaining a complete pallet width.

Among the various methods conceived by the manufacturers, the following patents can be mentioned. European Pat. No. 31 596 filed by the Emil DOLL Co., European Pat. No. 33 873 filed by the MEIER Co., European patents filed by the KASSBOHRER Co. No. 66 269 and 168 521, European Pat. Nos. 111 760 filed by ORTHAUS and No. 122 527 by KRONE, Swiss Pat. No. 570 294 VETTER and French Pat. No. 2 544 258 FREJAT.

These prior methods concern mechanical drawbars in the form of slide rail guides for the hitch gear in the longitudinal direction and twin mechanical means of moving the drawbar from the rear toward the front in the curves.

These means of adjustment prove to be delicate and sensitive to shocks. Accordingly, they have to be protected.

Furthermore, their construction is expensive and they favor the generation of swaying going downhill.

In other respects, currently on the market are extensible, so-called active control drawbars.

In these units, the drawbar is lengthened by a pneumatic device controlled by a proximity detector with or without contact. The approach of the trailer beyond a minimum distance is thus detected and actuates a pneumatic device for an extension thrust to avoid collisions between the rear of the truck and the trailer. The energy necessary for the lengthening motion of the drawbar is taken from the truck power or furnished by an independent auxiliary unit.

This type of solution requires complex and expensive implementation. It is also limited by the geometry of the system and by the speed of reaction of the hydraulic assembly.

In other respects, their application to a unit consisting of a tractor and a semi-trailer proves to be not obvious.

The other drawbacks of these systems concern the weight and space requirement.

The purpose of this invention is to correct these drawbacks by proposing a particularly simple and efficiency short hitch with variable geometry applicable to a so-called balanced trailer or trailer with central axles, and to a semi-trailer.

The general purpose of the invention consists of maintaining a minimum distance between the front face of the trailer and the adjacent face of the truck during all stages of turning up to the maximum turn, i.e., with the trailer perpendicular to the truck in the case of balanced trailers and semi-trailers.

This minimum distance is imposed pursuant to the invention by the linkage support contact at the ends of two extensible connecting bars linked on the one hand to the chassis of the truck and on the other hand to the front of the trailer, at a common point, or separately on both sides of the drawbar.

To accomplish this, it relates to a short hitch with variable geometry for so-called balanced trailers and semi-trailers comprising an extensible drawbar with length variable with the turning angle, characterized by the fact that associated with the extensible drawbar on the one hand is a means of continuous elastic return to a position of minimum separation of the trailer from the truck, and on the other hand, two symmetrical movable linkage and support bearings in the form of movable linkage support parts for the purpose of pivoting the front face of the trailer, when turning to the right or to the left, around a corresponding vertical axis movable circularly, adapted to each side, in continuous support contact with the truck structure between a position in a straight line and a turning position. The elastic return force maintains a minimum distance between the front face of the trailer and the adjacent face of the truck up to and during the position of maximum turning.

As indicated, the short hitch pursuant to the invention has great superiority and numerous advantages over the current hitches:

large gain in space both for bulk loads and for loads on pallets;

total safety when driving in a straight line and in the curves;

better stability in the curves;

the hitching grip at the rear of the truck remains of the universal type permitting the truck to pull any kind of trailer;

the linkage support parts guarantee the maintenance of a minimal space in a straight line and corner clearance along the shortest path;

absolute safety because the possible failure of the cylinder producing the return force is manifested simply by a controlled lengthening of the drawbar up to a mechanical stop.

The invention will be well understood from reading the following description provided by way of nonlimiting example for two embodiments with reference to the accompanying drawings, in which:

FIGS. 3 and 4 are elevation and plan views, respectively, of a unit of the type of a semi-trailer whose linkage attachment is provided by the short hitch pursuant to the invention;

Figure 11:
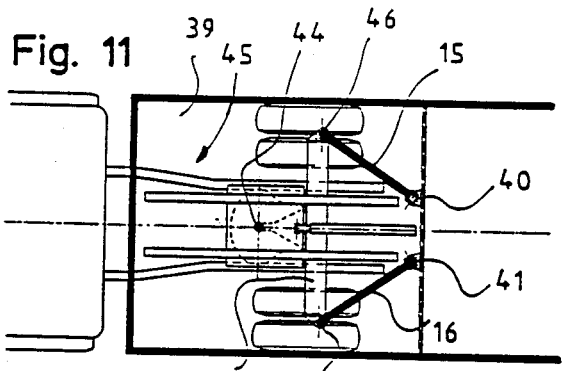
Figure 12:
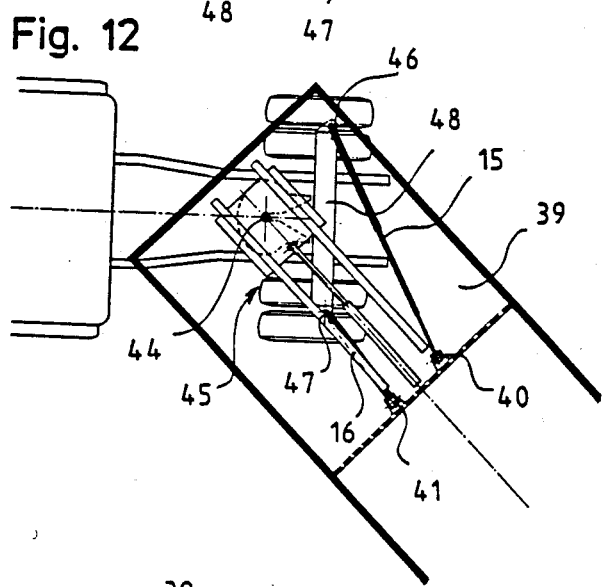
Figure 13:
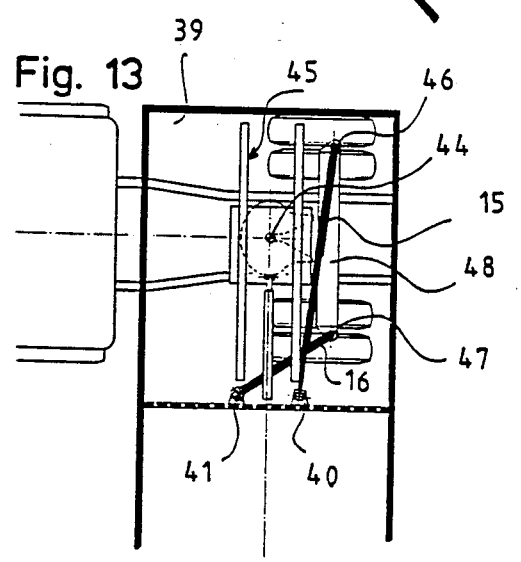

FIGS. 6, 7, and 8 are schematic plan views in the two limiting positions of straight line and perpendicular, and in an intermediate position of turning in the case of two extensible linkage support bars;

FIGS. 9 and 10 are elevation and plan views, respectively, of an example of embodiment of an extensible linkage support arm;

FIGS. 11, 12, and 13 are schematic plan views illustrating a second example of use according to three position configurations in the case of a semi-trailer;

FIGS. 14 to 18 are schematic plan views of a variation made with two supplementary linked bars:
retracted in a straight line
beginning of extension in a straight line
in straight line unloading extension
when turning to the left
when turning to the right;

FIG. 19 is a schematic plan view showing the envelope of the path of the front face of the trailer in the case of a simple hitch pursuant to the invention;

FIG. 20 is a schematic plan view showing the envelope of the path of the front face of the trailer in the case of a hitch with two supplementary linked bars;

FIGS. 21 and 22 are elevation views of a road unit, respectively on the level and in a hollow, of a variation with supplementary linkage parts in the upper section, for example rolling parts.

The invention will be described by way of example below, by its general features and then by its particular features in the case of several variations applied to a so-called balanced trailer, for example with central axles, and then to a semi-carried trailer.

The general inventive concept consists of using an extensible drawbar forced into continuous elastic return of the trailer toward the truck into a position of minimum separation with the help of two extensible pivoting bars symmetrical relative to the centerline of the unit, linked on the one hand to the chassis of the truck and on the other hand to the front face of the trailer at a common point, or at two distinct points so as to impose a circular path on the trailer link support during a turn. The bar located on the turn side receives the thrust of the return force. It serves as a support for the rotation that occurs by means of it around its pivoting linkage located on the truck chassis.

This rotation occurs with the retention of a minimal separation between the front face of the trailer and the rear face of the truck during the entire turn and up to the maximum turn, which is brought about by the elastic return force.

The drawbar is preferably but not exclusively made extensible by the same means that provides for the elastic return force. This can originate, for example, from a metallic spring or from one or more links with return effect.

The elastic return provides for the constant maintenance of a minimum separation determined by the mechanical bar hitch linkage.

The general concept disclosed above is implemented by the following general means, which are capable of obvious or minor modifications or of substitutions by any equivalent, similar, or derived means.

A carrier tow truck 1 pulls a balanced trailer 2 with central axles 3 comprising a chassis 4 integral with an extensible drawbar 5 capable of longitudinal motions toward or away from the rear face of the truck relative to the front face of the trailer.

The drawbar 5 is of the conventional type carried by a crossbar 8. Its central element 9 is composed of or lengthened by a telescopic assembly 10 actuated by a sliding device, for example a traction cylinder 11.

The central element 9 is terminated by an annular part 12 or equivalent that is held fast on a conventional hitch hook 13 or the equivalent.

As indicated above, the cylinder 11 can be dissociated from the central element 9 of the drawbar and can produce the same effects resulting in the extension or retraction of the drawbar.

According to another variation developed, two distinct means can be provided, operating in parallel, one for the extension or retraction of the cylinder, the other for the continuous elastic return to the position of minimum separation.

The means of extension and/or of continuous elastic return into a position of minimum separation above is and/or are associated with a double assembly 14 of symmetrical linkage support bearings movable by mechanical linkage parts connecting the front of the trailer to the rear of the truck.

It should be noted here that the drawbar remains fixed relative to the trailer along its central longitudinal axis because it is integral with the chassis beams.

The basic embodiment of the functions of linkage, support, and pivoting linkage part pursuant to this invention on trailers and semi-trailers is shown in FIGS. 1 to 13. A refined variation is illustrated by the diagrams of FIGS. 14 to 17 showing the principal road configurations.

Movable linkage support bearings are made, procured by parts in the form of extensible bars 15 and 16, linked on the one hand to each end 17 or 18 of a crossbar 19 integral with the truck chassis, and on the other hand to the front of the trailer at two points 20 and 21 located on each side of the horizontal pivoting axis of the drawbar 5.

As indicated, the points 20 and 21 can be merged.

The extensible bars 15 and 16 shown in detail in FIGS. 9 and 10 are formed of three telescopic portions 22, 23, and 24, for example, of which the end portions are terminated by frames 25 and 26 crossed by a linkage shaft 27 and 28 carried by a bearing part 29 and 30.

In a more complex variation, the bars have a fixed length 31 and 32, linked by intermediate linkages 33 and 34 to an extensible device 35 composed of two crossed bars 36 and 37, for example, that are fastened in a transverse rest position against a transverse support plate 38 by the return force of the traction cylinder.

The crossed bar on the turn side forced into a transverse position supported against the transverse plate 38 plays no active role during the turn. It simply imposes a fixed working position on the intermediate linkage 33 or 34. Thus, the end of the bar in question 31 or 32 also describes a path of circular shape.

Each bar opposite the crossed bars 36 and 37 permits obtaining the necessary variable separation while turning, between the rear face of the truck and the opposite half-section of the front face of the trailer.

This refined variation constitutes a perfect equivalent of the hitch above, since each part performs the same functions as those of the basic variation to obtain the same results.

The same applies to the extensible bars applied to semi-trailer 39 (FIGS. 3 and 4), in which the extensible arms 15 and 16 are linked at two symmetrical points 40 and 41 to the transverse face 42 recessed from the subface return 43, traditionally called the gooseneck.

The hitch plate and its working pin 44 that constitute the trailer section of the hitch are mounted on a frame 45 that slides with the cylinder 11 in continuous elastic return on the subface of the front section of the semitrailer, with this extensible assembly being equivalent to the drawbar 5. The extensible bars are linked at two points 46 and 47 to each end of a crossbar 48 mounted on the chassis at or near the rear axle of the tractor.

Of course, the variation described applies in the same way to a semi-trailer (case not shown).

Figure 1:
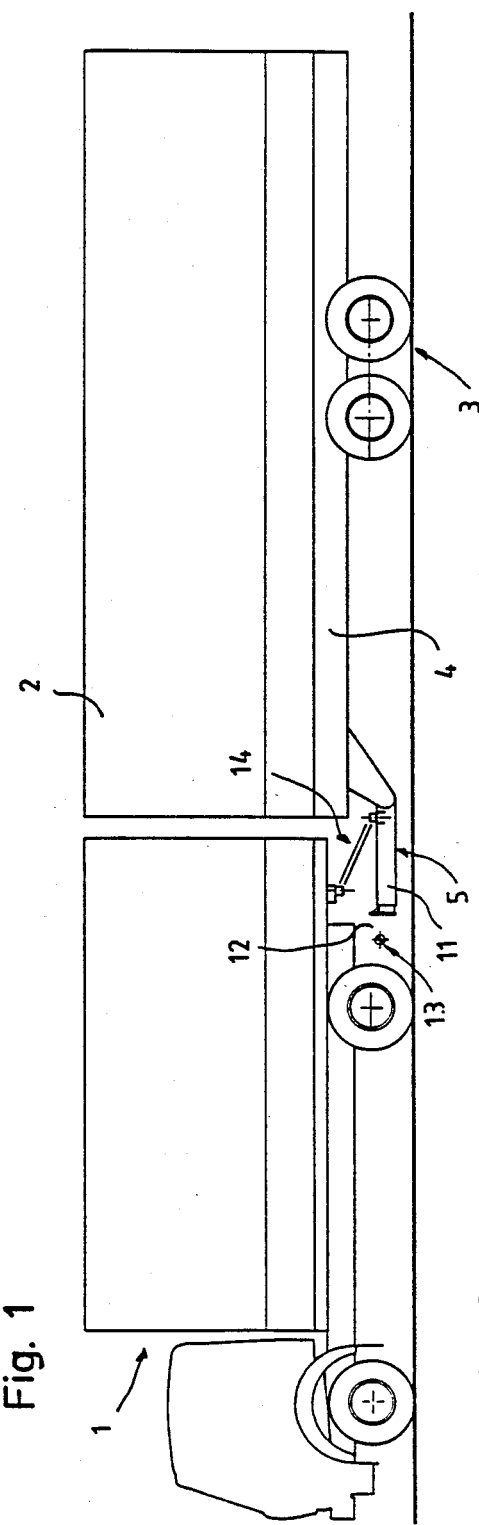
FIGS. 1 and 2 are elevation and plan views, respectively, of a unit of the type of a truck and so-called balanced trailer, or trailer with central axles, whose linked joining is provided by the hitch pursuant to the invention composed of an extensible drawbar and two extensible linkage support bars.
Figure 2:
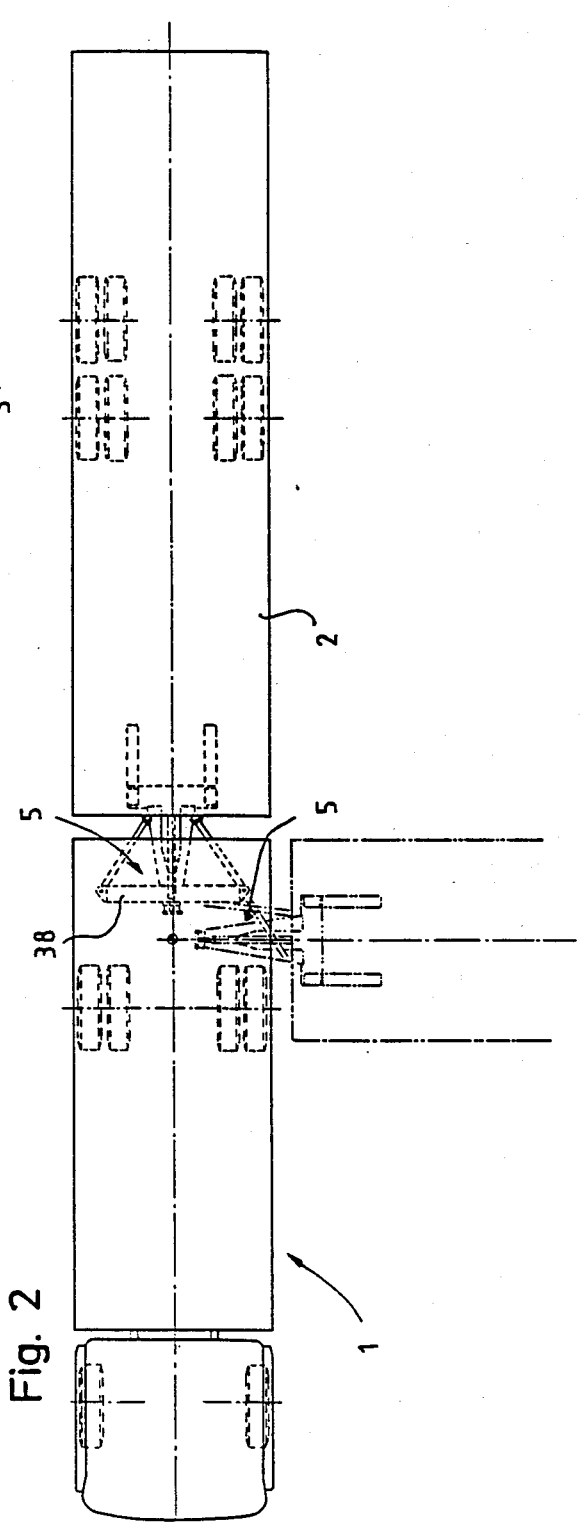
Figure 5:
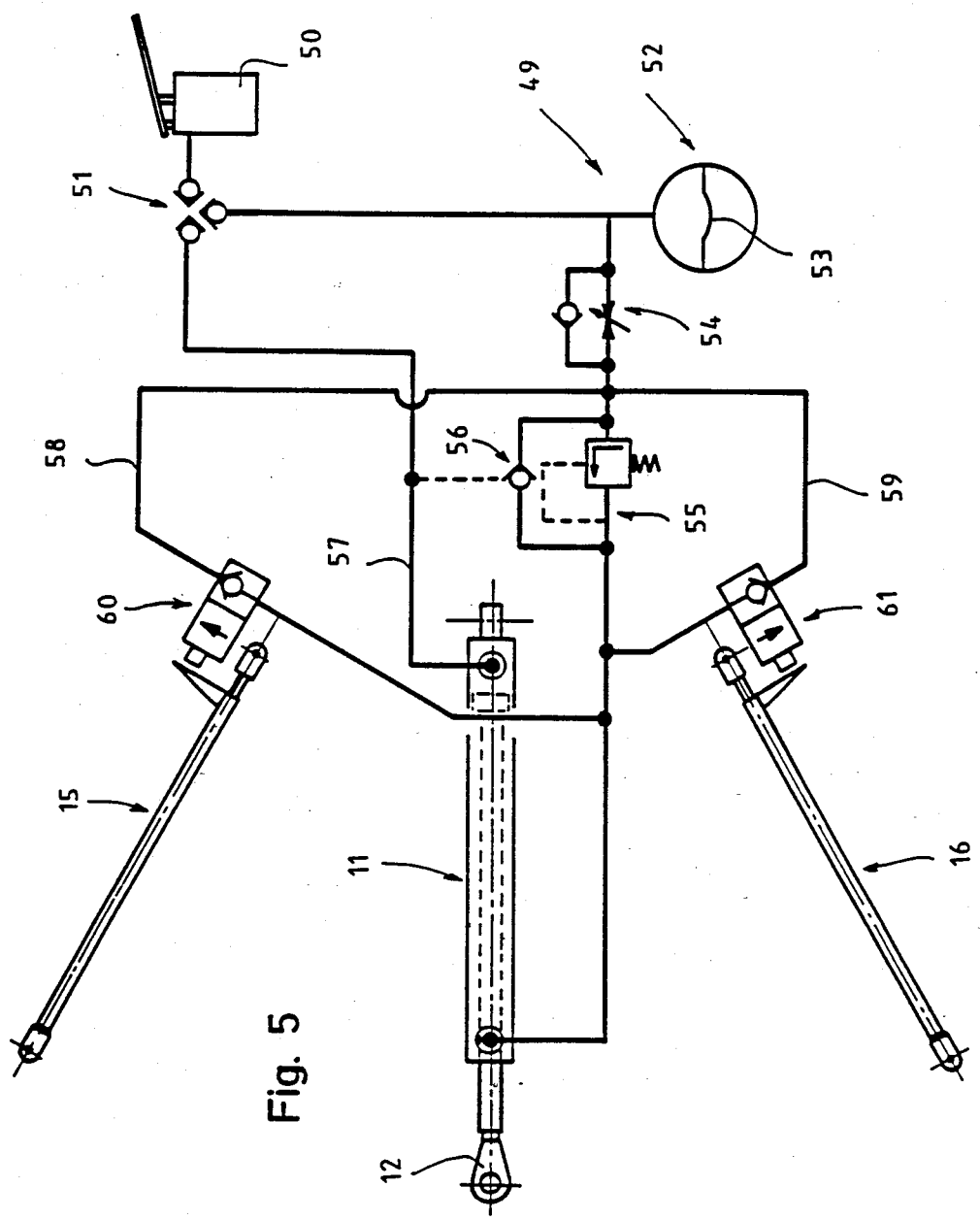
FIG. 5 is the hydraulic control circuit diagram of the drawbar extension cylinder showing the contact detector.

We will now examine the hydraulic cylinder control and the various safety devices provided for in case of its failure or of an abnormal configuration between the truck and the trailer, with reference to FIG. 5.

This is a closed hydraulic circuit 49 in which the hydraulic fluid is injected under pressure from a hand pump 50 or equivalent, through a hydraulic coupler 51 to an oil-pneumatic membrane or piston accumulator 52, 53.

The principal circuit includes the cylinder 11, for example a double-action cylinder, a throttle 54 intended to restrain the return of fluid to the chamber on the rod side of the cylinder 11, with the throttle being bypassed by a check valve, a hydraulic pressure shutoff 55 whose discharge is calibrated to a safety pressure threshold, for example 250 bars. The shutoff 55 is bypassed by a valve 56 controlled from the line 57 supplying the chamber of the cylinder on the drawbar extension side.

Two circuits 58 and 59 comprising support contact detectors 60 and 61 carried by each extensible bar, are mounted in parallel on the pressure shutoff 55. They are limit hydraulic slide valves or the like closing the circuit at rest.

In continuous operation, the return force remains quasi-constant because of the pressure balancing by the accumulator 52. This is the case when the two detectors are actuated simultaneously, standard straight-line situation, or when a single detector is actuated, turning situation.

The support contact detectors are used to trigger a sequence of resistance to the lengthening of the cylinder.

If none of the detectors is actuated, i.e., if both of them remain in the air simultaneously, in a situation of acceleration, upward slope, or emergency braking, contact with the trailer is no longer provided for simultaneously on the two linkage support parts as shown in FIG. 5. In this case, the two detectors and their associated circuit permit forcing the passage of the fluid through the pressure shutoff 55, and because of this, providing maximum resistance by the cylinder to the lengthening up to the maximum calibration value, beyond which the shutoff will pass and establish a direct return to the accumulator.

A maximum resistance to the lengthening, providing supplementary safety, is thus determined.

The hand pump also permits manual control of the cylinder to produce the lengthening of the linkage manually to be able to open the doors or other access between the trailer and the truck.

For safety reasons, complementary pivoting bars 62 and 63 can be provided in the upper section, which provide for avoiding the collision of the upper corners of the truck and of the trailer when passing through severe hollows, as shown in FIGS. 21 and 22, and because of this, they also permit supplementary reduction of the minimum separation by clearance at the bottom or at the top in hollows or on hills.

The operation proves to be simple. In a straight line, the traction cylinder 11, by the return force that it develops, holds the trailer against the rear face of the truck by means of the linked bars.

When making curves, the continuous return force forces the trailer against the bar in service mounted to pivot on the truck.

Referring to FIGS. 6 to 13, the work of the two extensible bars is shown. This same work is carried out in the refined variation by the crossed bars in series with the arms of fixed length of the refined variation (FIGS. 14 to 18).

During a turn to the left, the left extensible bar (FIGS. 7 and 12) plays the supporting role. It remains retracted to its minimum length and continuously receives the thrust of the return force of the cylinder and of the axial component of the rotation.

The path of the point of linkage on the trailer is a circular arc with a center of rotation identical with the opposite end of the bar.

In maximum turning, with the trailer and truck perpendicular, the arms cross as shown in FIGS. 8 and 13.

In the case of the embodiment shown in FIGS. 14 to 18, one of the crossed bars 36 or 37 striking against a transverse bumper integrated with the crossbar 38 immobilizes the intermediate linkage. The assembly accordingly behaves in a way identical with the above variation in the turns.

Various modifications are possible within the scope of this invention, not only those in the area of equivalents, but also direct, simple, or obvious variations.

I claim:

1. A hitch system for interconnecting a tractor vehicle having a longitudinally extending axis, and a trailer vehicle having a longitudinally extending axis, wherein said longitudinal axes of said tractor and trailer vehicles are normally coaxially disposed with respect to each other under straight-line operating conditions of said tractor-trailer vehicles so as to define a common longitudinal axis between said vehicle, comprising:

an elongated drawbar, having a longitudinal axis and which is axially extensible along said longitudinal axis, fixedly secured to said trailer vehicle such that said longitudinal axis of said elongated drawbar is always coaxially disposed with respect to said longitudinal axis of said trailer vehicle during both said straightline and turning operating conditions of said tractor and trailer vehicles, and pivotably connected to said tractor vehicle;

a first longitudinally extensible bar pivotably connected at one end thereof to said tractor vehicle at a location located upon a first lateral side of said longitudinal axis of said tractor vehicle and upon a first lateral side of said common axis defined between said tractor and trailer vehicles, and pivotably connected at a second end thereof to said trailer vehicle at a location located upon a first lateral side of said longitudinal axis of said trailer vehicle and upon said first lateral side of said common axis defined between said tractor and trailer vehicles; and a second longitudinally extensible bar pivotably connected at one end thereof to said tractor vehicle at a location located upon a second lateral side of said longitudinal axis of said tractor vehicle and upon a second lateral side of said common axis defined between said tractor and trailer vehicles, and pivotably connected at a second end thereof to said trailer vehicle at a location located upon a second lateral side of said longitudinal axis of said trailer vehicle and upon said second lateral side of said common axis defined between said tractor and trailer vehicles.

2. A hitch as set forth in claim 1, further comprising:
means operatively connected to said axially extensible drawbar for contracting said axially extensible drawbar from an axially extended disposition to a normally non-extended disposition so as to define a predetermined minimum separation between said tractor and trailer vehicles.

3. A hitch as set forth in claim 2, wherein:
said contracting means comprises a hydraulic cylinder.

4. A hitch as set forth in claim 3, wherein said contracting means further comprises:
an accumulator fluidically connected to said hydraulic cylinder;
a supply circuit, including hydraulic shut-off means, interposed between said accumulator and said hydraulic cylinder; and
contact detectors interposed between said tractor and trailer vehicles for controlling said hydraulic shut-off means.

5. A hitch as set forth in claim 1, wherein:
said second ends of said first and second longitudinally extensible bars are respectively connected to opposite sides of said extensible drawbar.

6. A hitch as set forth in claim 1, wherein:
said drawbar is connected to said tractor vehicle at a location disposed upon said longitudinal axis of said tractor vehicle.

7. A hitch as set forth in claim 1, wherein:
each one of said first and second extensible bars comprises a plurality of telescopically disposed members.

8. A hitch as set forth in claim 7, wherein:
said each one of said first and second extensible bars comprises three telescopically disposed members.

9. A hitch as set forth in claim 1, further comprising:
a crossbar fixedly secured to said tractor vehicle; and
said one end of each one of said first and second extensible bars is connected to an opposite end of said crossbar.

10. A hitch as set forth in claim 9, wherein:
said crossbar is disposed substantially perpendicular to said longitudinal axis of said tractor vehicle.

* * * * *